May 12, 1953     E. PIETZ     2,638,303

SHOCK MOUNT

Filed March 12, 1946

Inventor
ERVIN PIETZ

By M. C. Hayes

Attorney

Patented May 12, 1953

2,638,303

UNITED STATES PATENT OFFICE 2,638,303

SHOCK MOUNT

Ervin Pietz, Cambridge, Mass., assignor, by mesne assignments, to United States of America as represented by the Secretary of the Navy Application March 12, 1946, Serial No. 653,907

2 Claims. (Cl. 248—358)

This invention relates to resilient mountings and more particularly to vibration and shock absorbing mountings.

The matter of properly supporting devices such as instruments, radios, etc., and particularly in aircraft, ships, automobiles and other vehicles, is a problem which has long attended their use.

This is particularly true of uses wherein a large number of shocks and vibrations of varying range and magnitude, such as may be provided by gunfire, must be absorbed and where limitations of space may compel the use of a smaller mount than is desired.

It is therefore an object of the present invention to provide a mount which is small and compact but which has a great capacity for the absorption of shocks and vibrations.

Another object is to provide, in such a small compact mount, a construction having a suitable resonant frequency for the task at hand.

Still another object is to provide a structure wherein it is possible to maintain a maximum softness of the mount throughout a shock cycle.

A further object of the present invention is to provide a resilient mounting construction wherein a controlled degree of pre-compression may be applied to the mount in order to lend a greater stiffness and a higher shock resistance thereto.

Another object is to provide a resilient mount which is easily assembled and disassembled and is readily adapted to be mounted either in the vertical or horizontal plane and will exhibit marked shock resistance in both planes.

Other objects and advantages will be apparent from the following specification and the appended drawings, in which latter:

Figure 1:
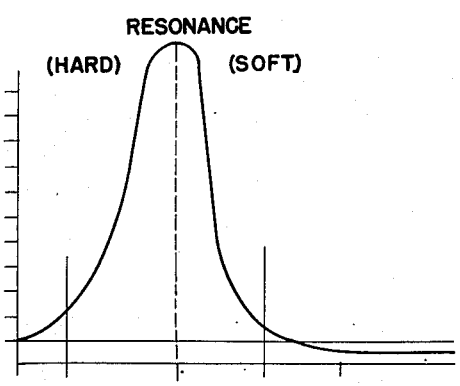
Fig. 1 is a graph showing the general characteristic response curve of a resilient mount.

A graph of a general characteristic response curve of a resilient mount is shown in Fig. 1. It indicates the response (ratio of amplitude of vibration of the source of excitation) as plotted against the ratio of frequency of vibration to the lesser frequency of the mount. On the left side of the "resonance" peak indicated on the graph is located the general characteristic response curve of a "hard" type of mount. While to the right of this "resonance" peak is located the general characteristic response curve of a "soft" mount. The present invention is particularly directed to such "soft" mounts, which operate in the right-hand portion of the general characteristic response curve; however the usual soft mount will have, for normal deflection, characteristics which are undesirably large and, in the size of mount which may be employed in the crowded conditions frequently encountered, the static deflection under load for a mount in this position of the general characteristic response curve will be considerable.

It has been found that for radar installations on shipboard a stiff mount having a resonant frequency above the expected range of vibration is the only suitable type. This necessitates the tolerance of a certain amount of amplification of fundamental vibration amplitudes and accelerations being greater than one (see Fig. 1) but in most instances this is not objectionable. An amplification constant of two has been found to be quite reasonable.

Figure 3:
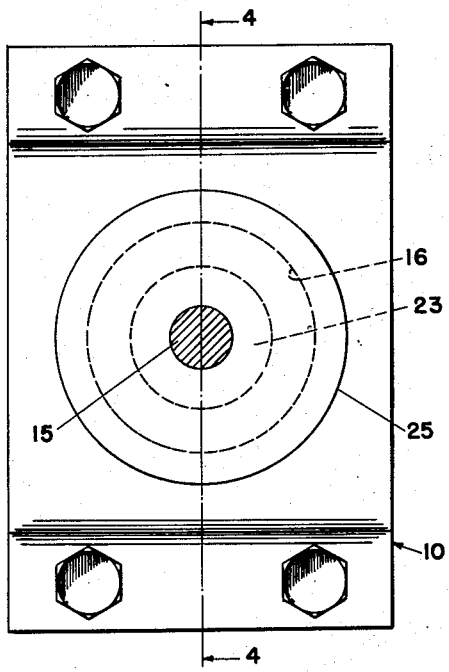
Fig. 3 is a top plan view partially in section of the present invention and taken along a line substantially corresponding to line 3—3 of Fig. 2.
Figure 4:
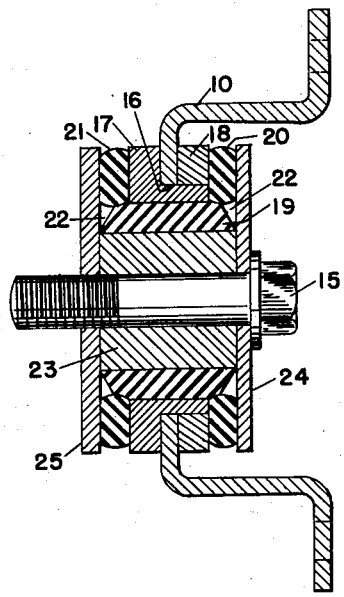
Fig. 4 is a transverse sectional view of the present invention taken along a line substantially corresponding to line 4—4 of Fig. 3.
Figure 2:
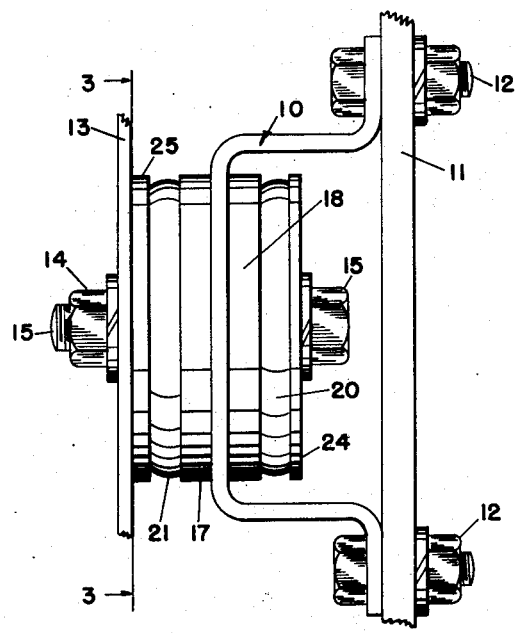
Fig. 2 is a side elevation of a mount constructed in accordance with the present invention.

In the embodiment illustrated in Figs. 2–4 inclusive there is shown a channel shaped mount member or support member 10 which may be secured to a main support member 11 as by means of nuts and bolts 12. The load member such as an instrument, or other device to be supported, may be represented by a load bracket 13 which is securely retained in position by means of a nut and lock washer arrangement 14 on the end of a tie bolt 15. In order to support the load bracket 13 from the channel member 10 there is provided a shock mount which is internally constructed according to the disclosure of Fig. 4. As there shown the bracket to has a large central opening 16 which opening may be lined with an enlarged separable bushing or grommet comprising a sleeve member 17 and ring member 18 which enlarged bushing provides a substantial enlarged surface against which the resilient material of the shock mount may bear. Within the hollow center of the bushing so formed may be inserted a sleeve 19 of resilient material which is preferably tapered or chamfered at its ends, as shown, so that there is provided, adjacent the end rings 20 and 21 of resilient material, a space 22 into which adjacent resilient material may be displaced as required under conditions of load or shock. A core or spacer sleeve 23, which may be solid if desired, is located within the sleeve 19.

The assembled parts are retained in place about the tie bolt 15 by means of a thin washer 24 at the head end of the bolt and a thicker threaded screw-on type washer 25 at the opposite end of the bolt. The length of the core 23 is preferably such that the resilient parts of the mount will be placed under a limited amount of precompression the magnitude of which must be determined by the character of the load to be supported and the conditions of shock to be encountered. The unit so adjusted is complete in itself and may be handled as such. When installed in place, as illustrated in Fig. 2, the nut and lock washer arrangement 14 serve to secure the load bracket 13 to the resilient mounting. In the present mount there is no possibility of metal to metal contact under conditions of extreme shocks.

As rubber compresses its compression modulus increases approximately linearly and by tapering each end of the cylindrical rubber sleeve 19, annular spaces 22 are provided into which the resilient material displaced under shock may expand. This is important inasmuch as rubber is substantially incompressible.

While a particular embodiment of the invention is shown, it will be understood, of course, that it is not desired to be limited thereto since many modifications may be made, and it is, therefore, contemplated by the appended claims to cover any such modifications as fall within the true spirit and scope of this invention.

What is claimed is:

1. A resilient mount for instruments and the like comprising a support member having a mount receiving opening therein, an annular bushing lining said opening and embracing said support member and having inner and side surfaces to engage with resilient material, a sleeve of resilient material mounted within and in engagement with the said inner surface of said bushing, a pair of rings of resilient material surrounding said resilient sleeve at the opposite ends thereof and being in engagement with the said side surfaces of said bushing and having a portion of their inner surfaces in engagement with said resilient sleeve, the ends of said resilient sleeve being tapered away from the area of engagement with said resilient rings and providing a space between said resilient sleeve and a portion of the inner surfaces of said resilient rings for deformation and expansion of the resilient material, a pair of spaced washers having portions in engagement with the outer sides of said rings of resilient material, a spacer sleeve between said washers and within said resilient sleeve, and detachable means for retaining said washers in engagement with the spacer sleeve and in contact with the resilient material, thereby providing a readily assembled and disassembled independent resilient unit.

2. A resilient mount for instruments and the like comprising a support member having a mount receiving opening therein, an annular bushing lining said opening and embracing said support member and having inner and side surfaces to engage with resilient material, said bushing comprising two interengaging separable bushing members embracing said support and including a sleeve member providing said inner and one side surface and a ring member completing the other side surface of the bushing, a sleeve of resilient material mounted within and in engagement with the said inner surface of said bushing, a pair of rings of resilient material surrounding said resilient sleeve at the opposite ends thereof and being in engagement with the said side surfaces of said bushing and having a portion of their inner surfaces in engagement with said resilient sleeve, the ends of said resilient sleeve being tapered away from the area of engagement with said resilient rings and providing a space between said resilient sleeve and a portion of the inner surfaces of said resilient rings for deformation and expansion of the resilient material, a pair of spaced washers having portions in engagement with the outer sides of said rings of resilient material, a spacer sleeve between said washers and within said resilient sleeve, and detachable means for retaining said washers in engagement with the spacer sleeve and in contact with the resilient material, thereby providing a readily assembled and disassembled independent resilient unit.

ERVIN PIETZ.

References Cited in the file of this patent

UNITED STATES PATENTS

| Number | Name | Date |
|---|---|---|
| 1,830,118 | Lord | Nov. 3, 1931 |
| 1,998,206 | Rosenzweig | Apr. 16, 1935 |
| 2,018,860 | Lord | Oct. 29, 1935 |
| 2,076,034 | Lampman | Apr. 6, 1937 |
| 2,138,176 | Keys | Nov. 29, 1938 |
| 2,139,370 | Lauer et al. | Dec. 6, 1938 |
| 2,382,372 | Wallerstein | Aug. 14, 1945 |
| 2,384,096 | Kishline | Sept. 4, 1945 |
| 2,386,463 | Hile | Oct. 9, 1945 |

FOREIGN PATENTS

| Number | Country | Date |
|---|---|---|
| 524,203 | Great Britain | Aug. 1, 1940 |